May 12, 1964    A. J. SLEMMONS    3,132,457
GRASS CATCHER ASSEMBLY
Filed Sept. 22, 1960    4 Sheets-Sheet 1
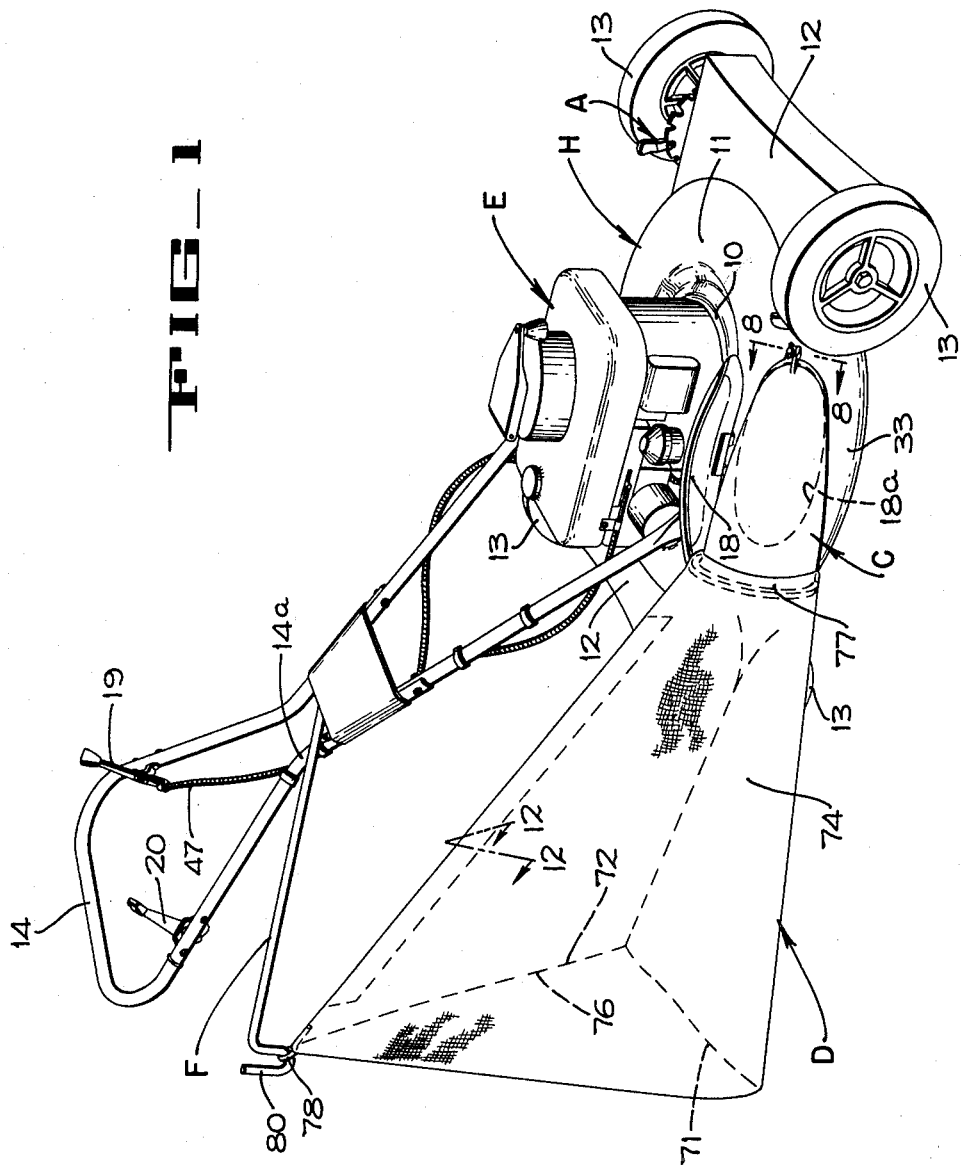
FIG_1
INVENTOR
ARTHUR J. SLEMMONS
BY Hans G. Hoffmeister
ATTORNEY

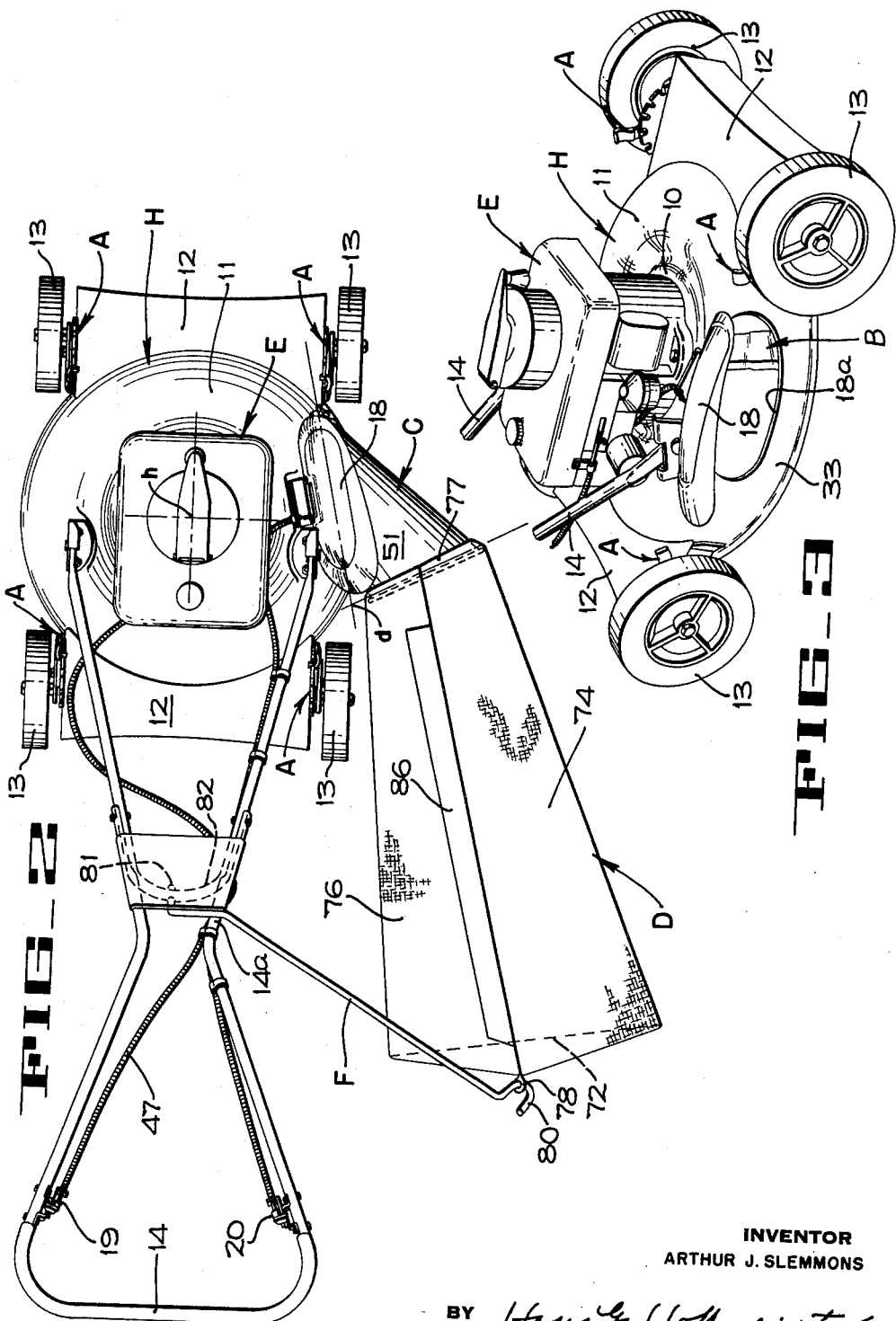

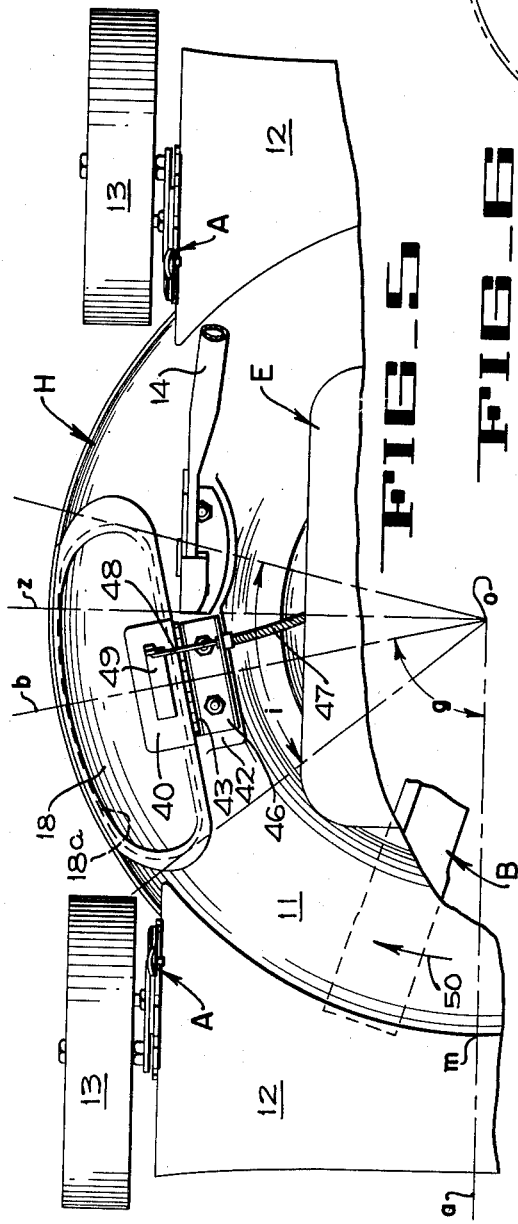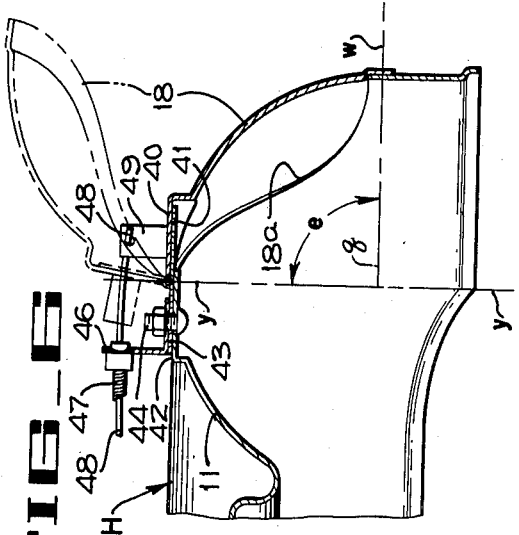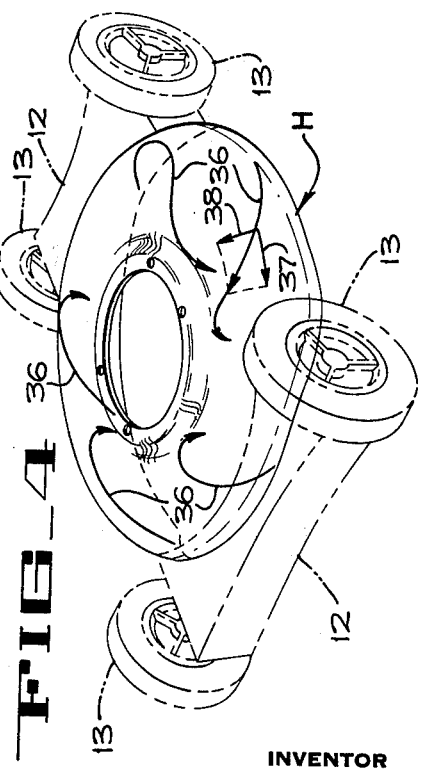

May 12, 1964  A. J. SLEMMONS  3,132,457
GRASS CATCHER ASSEMBLY
Filed Sept. 22, 1960  4 Sheets-Sheet 4
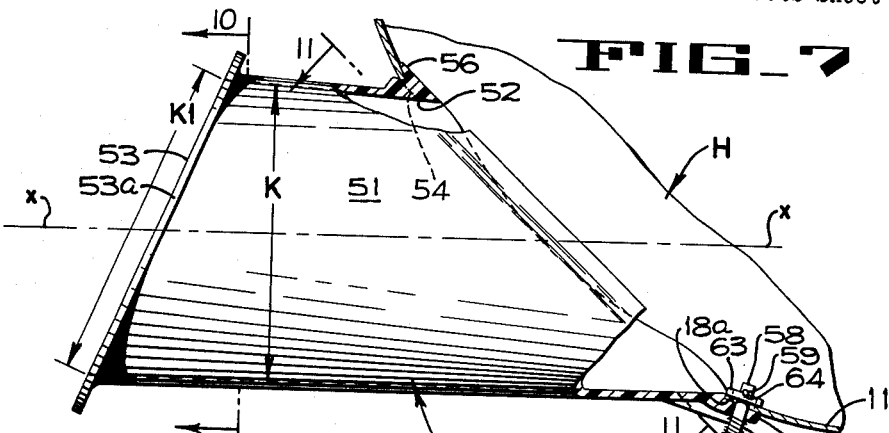
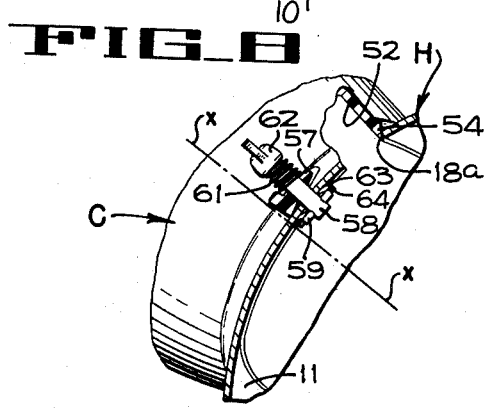
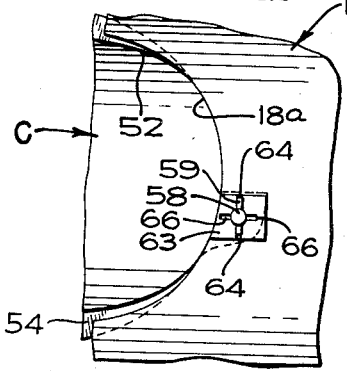
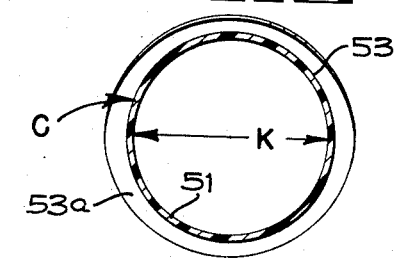
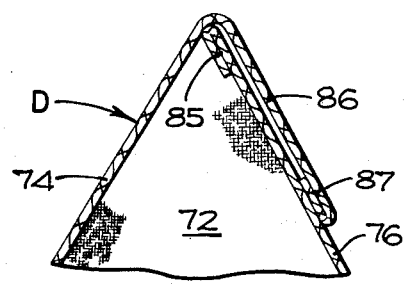
INVENTOR
ARTHUR J. SLEMMONS
BY *Hans F. Hoffmeister*
ATTORNEY

United States Patent Office 3,132,457
Patented May 12, 1964

3,132,457
GRASS CATCHER ASSEMBLY
Arthur John Slemmons, Los Gatos, Calif., assignor to
FMC Corporation, a corporation of Delaware
Filed Sept. 22, 1960, Ser. No. 58,602
3 Claims. (Cl. 56—202)

This invention relates to a combined rotary mower and cutting collecting machine, the cutting collecting portion of the combination including a bag and means to mount the bag on the mower housing.

An object of the invention is to facilitate the mounting and dismounting of the bag on the mower. In accordance with the invention, a tubular chute is provided for mounting over a discharge opening in the mower housing. The outlet mouth of the chute is inclined to the major axis of the chute, and is elliptical. With this construction, a bag having an inextensible inlet throat of the proper size can be readily slipped over the discharge end of the chute, and the throat of the bag will become self-tightening or self-gripping on the chute when the throat is pulled toward a flange surrounding the inclined outlet mouth of the chute.

Another object of the invention is to simplify the collecting bag emptying and closing procedure. This is accomplished by making the bag in such form that no mechanical means are required to close it. To this end, an overlapping seam is formed along the upper edge of one side wall of the bag, which seam overlaps and hugs the other side wall when the bag is mounted on the chute at one end and supported under tension from the handle bars of the mower at the other end.

The manner in which these and other objects of the invention may be obtained will be apparent from the following detailed description of the invention:

FIGURE 1 is a perspective of the mower and cutting collecting assembly of the invention.

FIGURE 2 is a plan of the mower and cutting collecting assembly.

FIGURE 3 is a perspective of the mower with the cutting collecting assembly removed.

FIGURE 4 is a diagrammatic simplified perspective of the mower housing, with arrows drawn thereon indicating the circulating action imparted to the cuttings.

FIGURE 5 is an enlarged fragmentary plan of the mower showing the door for the cutting discharge opening.

FIGURE 6 is an enlarged fragmentary section through the mower housing at the discharge door.

FIGURE 7 is an enlarged fragmentary horizontal section through the mower housing, showing the mounting of the collecting chute on the housing.

FIGURE 8 is an enlarged fragmentary transverse section taken on line 8—8 of FIGURE 1 and showing further details of the chute mounting.

FIGURE 9 is an enlarged fragmentary bottom elevation showing the chute mounting rod and pin.

FIGURES 10 and 11 are sections of chute taken on lines 10—10 and 11—11, of FIGURE 7, respectively, drawn to a somewhat reduced scale.

FIGURE 12 is an enlarged fragmentary section of the bag taken on line 12—12 of FIGURE 1.

General Arrangement

The assembled rotary mower and cutting collecting unit is shown in FIGS. 1 and 2. The main frame of the mower is in a form of a housing H having a flat central portion 10 to which an internal combustion engine E is bolted, and a semitoroidal portion 11 which cooperates with the cutting blade B (FIGS. 3 and 5) to cause a circulating recutting action on the cuttings. Such a mower is described and claimed in applicant's Patent 3,085,386, April 16, 1963, assigned to the assignee of the present application. Supporting wheels 13 are rotatably mounted on aprons 12 rigid with the front and rear portions of the housing. As seen in FIGS. 1–3, 5 and 6, a door 18 is provided for a cutting discharge opening 18a formed in the housing H, and mounted on the housing in communication with the discharge opening 18a is a tubular cutting collecting chute C which in turn supports a seam 77 forming the inlet throat of a cutting receptacle D, the receptacle being in the form of a porous fabric bag. The discharge opening 18a in the housing is shown in FIG. 3 with the chute removed. The door 18 may be opened or closed by a control 19 mounted on the mower handle. As seen in FIGS. 1 and 2, the rearward upper corner of the collecting bag is supported by an arm F extending from the mower handle 14. A throttle control 20, terminates at the upper portion of the handle. Suitable height adjustment mechanism A is provided for raising and lowering the wheels relative to the mower housing for adjusting the cut of the mower.

Collecting Chute and Bag Assembly

As previously mentioned in the general description, this assembly includes a tubular chute C and a collecting bag D. The construction of the chute and its mounting on the mower housing are shown in FIGS. 7–12. The chute has a generally tubular body 51 which body is ellipsoidal in section. The chute has an inlet mouth 52 for cooperation with the discharge opening 18a of the mower housing, and an outlet mouth 53 for mounting the inlet throat of the collecting bag D. The outlet mouth 53 is surrounded by an outwardly extending flange 53a, and this flange, and hence the outlet mouth of the chute, is inclined to the major chute axis $x$—$x$ (FIG. 7) by an angle of about 67°.

The inlet mouth 52 of the chute is formed with a generally conical outer surface 54 that forms an air seal with the discharge opening 18a in the housing (FIGURE 8). The entrance mouth of the chute is inclined to the major axis $x$—$x$ of the chute by an angle of about 45°. As seen in FIG. 2, the inclinations of the inlet and exit mouths of the chute result in the bag extending rearwardly substantially parallel to the fore and aft mower axis. The planes of the inlet and outlet mouths of the chute intersect in an approximately vertical line $d$ (see FIG. 2) that is disposed rearwardly of the axis $h$—$h$ of the housing and laterally outward from the side of the housing in which the discharge opening 18a is provided.

In order to mount the chute on the mower housing, a hook 56 is formed at the rearward edge of the inlet mouth of the chute, which hook can be slipped through the opening 18a to engage the inner surface of the mower housing. The opposite or forward edge of the inlet mouth of the chute is secured on the housing by means of a lug 57 (FIGS. 7–9) extending along the outer surface of the housing. Mounted in the lug is a latch rod 58 having a transverse pin 59 at its inner end. There is a spring 61 on the outer end of the rod under compression between the lug 57 and a wing nut 62 on the rod. Welded to the undersurface of the housing is a pad 63. The housing and pad are apertured to receive the mounting rod 58. The pad has a shallow groove 64 to receive the pin 59 and the housing and pad are formed with a keyhole slot 66 to permit insertion of the pin 59. In order to mount the chute on the mower, the hook 56 of the chute is slid underneath the housing wall, the wing nut 62 is grasped and rod 58 turned in order to align the pin 59 with keyhole slot 66 in the housing and the pad. Now by compressing the spring 61 the pin 59 can be pushed through the keyhole slot, after which the rod 58 is given a quarter turn, whereupon the spring 61 urges the transverse pin 59 into the groove 64 in the pad 63. This securely mounts the chute on the mower housing.

The construction of the bag appears in FIGS. 1, 2, and 12. The bag is semipyramidal in form and has a bottom wall 71 that is relatively flat, a triangular rearward end wall 72, and substantially flat outside and inside walls 74 and 76 respectively. The inside, outside, and bottom walls of the bag merge at the forward end of the bag into an inlet mouth that is seamed at 77, the seam being relatively inextensible. At the rearward upper corner of the bag, where the triangular end wall and the side walls of the bag meet, is an eyelet 78. The rearward upper corner of the bag is supported by the arm F having a hooked portion 80 at its free end for receiving the eyelet 78. As indicated in FIG. 2, the arm F is mounted on the mower handle 14 by inserting a terminal leg 81 of the arm through an aperture formed in a cross bar 82 forming part of the mower handle structure. The portion of arm F adjacent leg 81 crosses and rests upon the bar 14a that constitutes the right side of the mower handle 14.

An opening is provided for emptying the bag, and means are provided to make the opening self-closing. No fasteners are required to close the opening. This facilitates ready emptying of the bag. As seen in FIG. 12, which is a fragmentary section through the upper edge of the bag, i.e., the edge formed by the juncture of the inside and outside walls 74 and 76, the upper edge of the inside wall 76 is seamed as at 85. The upper edge of the outside wall 74 has an extension in the form of a flap 86, the edge of which is seamed at 87. When the bag is mounted on the chute and when the eyelet 78 is hooked to the mounting bar F, the upper edge of the bag is under sufficient longitudinal tension to cause flap 86 to hug or press against inner side wall 76 and so close the opening that is provided along the upper edge of the bag.

Because of the circulating action of the blade and mower housing assembly, a stream of air, bearing entrained cuttings, is blown into the bag, so that the bag must be made to permit air to pass through its walls. Therefore, at least the side walls of the bag are made of fabric having a relatively open mesh canvas material. The bottom wall may be reinforced or lined and need not be porous.

It has been stated that the seam 77 at the entrance mouth of the bag can be made substantially inextensible. This construction, which does not require drawstrings or closure members at the seam, is made possible by the shape of the outlet mouth portion 53 of the chute. The chute is ellipsoidal in section, and in the embodiment illustrated (FIGURES 7 and 10) the section of the chute taken perpendicular to the chute axis $x$—$x$ is substantially a circle. As also seen in FIGS. 7 and 10, this section of the chute has a diameter perpendicular to the chute axis that is indicated at K. The flange 53a formed at the outlet mouth 53 of the chute is inclined to the major axis $x$—$x$ of the chute by the angle of 67° previously mentioned. Because of this inclination the section of the chute taken at the flange 53a is elliptical, and hence has a major diameter K1 that is larger than the diameter K which is perpendicular to the axis of the chute. For example, with the outlet mouth inclined to the chute axis at the aforesaid angle of 67° and with an outlet mouth having a diameter K of 6 inches, the circumference of the chute at diameter K will be approximately 19 inches, whereas the circumference of the chute taken at flange 53a at diameter K1, will be approximately 20½ inches. With this construction, the seamed, relatively inextensible throat 77 of the bag is formed to have a circumference that is substantially equal to but slightly larger than the circumference of the chute taken at diameter K, for example the seam may have a circumference of 19½ inches.

In installing the bag on the chute, the seam 77 is first hooked over the outer or right hand side of flange 53a, and the bag is held so that the seam 77 is parallel to the diameter K, as such diameter is indicated in FIG. 7. In other words, the seam 77 is held perpendicular to the chute axis $x$—$x$. In this manner the seam 77 of the bag can be slipped over the flange 53a, whereupon it comes to rest substantially snugly around the cylindrical section of the chute at diameter K of the chute. Now when the eyelet 78 at the other end of the bag is slipped over hook 80 of the rod F, the upper longitudinal edge of the bag is taut, which applies tension to the seam 77. Such tension causes the seam 77 to ride along the surface of the chute until the seam is brought up against the flange 53a. Since the diameter of the chute along the elliptical section having major diameter K1 (FIG. 7) is greater than that of the circular section K, this shifting of the seam along the chute causes the seam to grip the chute. Thus, although the seam 77 can be readily slipped over the flange 53a of the chute, the seam becomes tight on the chute when the mounting of the bag is completed, and flange 53a is in itself sufficient to prevent dislodgement of the bag from the chute. Thus, the mounting operation is a simple one, as is that of dismounting the bag, because no drawstrings need be tied or untied, and no fasteners need to be manipulated. Furthermore, the seam 77 provides a strong, long lasting construction for the mouth of the bag, as compared to a construction employing a drawstring, the life of which is short.

Operation of Mower and Inter-relation With the Collecting Assembly

The dynamic circulating action that takes place around the housing is indicated diagrammatically in FIG. 4. Referring to the latter figure, the tangential or circumferential component of the motion of the cuttings, resulting directly from blade rotation is indicated by the arrow 37. The vertical component of such motion, resulting from the inclination of the ends of the blade is indicated by the arrow 38. These motions are combined and result in a generally helical circulatory motion of the cuttings, as indicated by the arrows 36 in FIG. 4.

When the door 18 is open and the chute C and collecting bag D are installed, the circulating and recutting action just described provides efficient collection of the cuttings. Since the material is cut, recut, and recut again, the collected material is comminuted so that the cuttings are small or fine. It has been found that when cuttings of this nature are blown into the bag there is a substantial increase in the area that can be mowed before the bag need be emptied, in comparison with prior rotary mowing and cutting collecting assemblies, wherein the circulating and recutting action characteristic of the mower of this invention is not present. Some of the cuttings, namely those that are initially cut ahead of the discharge opening 18a, will be blown directly into the bag as single cut cuttings. However, those cuttings that are not so discharged are recirculated and recut as described. In general therefore, the cuttings that are collected in the bag are relatively fine.

The center of the discharge opening 18a is positioned circumferentially of the housing in a location that facilitates most efficient collection of the cuttings, when the mower is propelled in a forward direction. As seen in FIG. 5, this location has been found to be one wherein the center of the discharge opening 18a lies along line $o$—$b$, which is circumferentially displaced by an angle $g$ of 78° from the forward mid-point $m$ of the housing H, which mid-point lies on the fore and aft mower axis $o$—$a$. In other words, the center line $o$—$b$ of the discharge opening is disposed relatively close to a line $o$—$z$ that represents the terminal boundary of the first quadrant of the mower housing through which an end of the blade B passes after departing from the forward mid-point $m$. The direction of blade rotation is indicated by the arrow 50 in FIGURE 5. With the discharge opening 18a circumferentially disposed in the aforesaid position, the mounting of the bag in a convenient, out of the way position is facilitated by the construction of the chute C, wherein the entrance mouth is inclined to the chute axis by an angle of about 45°. However, because of the circulating action imparted to the cuttings, the location of the discharge opening 18a relative to the front of the mower is not as critical as it would be with a mower that does not provide circulation about the entire circumference of the housing. As seen in FIG. 5, the opening 18a is of oval shape and subtends an angle $i$ in the horizontal plane of about 45°.

The position of the discharge opening in the vertical plane is indicated in FIG. 6. The upper edge of the discharge opening is at the intersection of the generatrix axis $y$—$y$ with the top or zenith of the housing, and the opening encompasses a vertical angle $e$ betwen the generatrix $y$—$y$ and a horizontal line $q$—$w$, of about 90°. Thus the opening occupies about 2/3 of the extent of the outer half of the housing in the vertical plane. With this location of the discharge opening in the vertical plane, the opening receives cuttings that still retain most of the kinetic energy initially imparted thereto by the inclined end portions 30 of the blade. Also, the velocity of the propelling air stream generated by the inclined ends of the blade is substantially at a maximum when the air stream reaches the discharge opening. This relationship and interaction of the discharge opening 18a and the other parts of the mower is described in more detail, and is claimed, in applicant's divisional application S.N. 266,773, filed February 25, 1963.

Although it does not form part of the present invention, and is described in detail and is claimed in my aforesaid copending application, the mounting of discharge door 18 will be briefly described. It is illustrated in FIGS. 5 and 6. The door 18 is shaped to correspond to the housing contour and merges with it smoothly. In order to mount the door 18 for hinged movement, a small section of the upper portion of the door 18 is flattened or embossed slightly at 40. A hinge leaf 41 is welded to the underside of the flattened portion 40. The housing portion 11 is also embossed slightly at 42 and the other hinge leaf 43 is mounted thereon by bolts 44. These bolts also mount an angle bracket 46, to which is secured the flexible guiding sheath 47 for a control wire 48. One end of the wire 48 connects to an angle bracket 49 welded to the top of the door, and the other end of the wire 48 connects to the handle control lever 19 (FIG. 1), conveniently located on the mower handle 14 for remote opening of the door.

The invention having been described in detail, it can be seen that the mower and cutting collecting combination of the invention provides a high degree of collection efficiency and facilitates the use of the apparatus. A large area can be mowed before the bag need be emptied, and removal of the bag, emptying of the bag, and replacement of the bag on the mower is a simple, readily accomplished operation. The discharge opening is located for optimum collecting efficiency, and the chute makes possible this location while mounting the bag in a convenient location.

While a particular embodiment of the present invention has been shown and described it will be understood that the rotary lawnmower and grass catcher assembly of the invention is capable of modification and variation without departing from the principles of the invention and that the scope of the invention should be limited only by the scope and proper interpretation of the claims appended hereto.

The invention having thus been described, what is claimed and desired to be protected by Letters Patent is:

1. In combination, a rotary mower and cutting collecting bag assembly, comprising a rotary mower having a handle, a chute having an inlet mouth for mounting over a material discharge opening in the mower housing, said inlet mouth being inclined at an acute angle to the chute axis, said chute having an outlet mouth, the section of said chute taken in a plane perpendicular to the chute axis and adjacent said outlet mouth being substantially circular, the outlet mouth of said chute being inclined at an acute angle to the chute axis in a direction opposite to the direction of inclination of said inlet mouth, the circumference of the chute taken along the periphery of said outlet mouth being greater than the chute circumference at said perpendicular section adjacent the outlet mouth, a porous fabric collecting bag having a continuous, substantially inextensible inlet throat mounted on said chute at said outlet mouth, and means for supporting the rearward end of said bag on the mower handle, the circumference of the inlet throat of said bag substantially equalling the circumference of said chute at said perpendicular section for causing said bag throat to grip said chute when it is drawn into alignment with the outlet mouth of the chute, said bag being generally triangular in vertical section and having a bottom wall, side walls that meet to form an open upper edge of the bag, and a rearward end wall, one of said side walls having a flap that overlies the other side wall, the force exerted between said bag mounting means and the bag inlet throat causing said flap to maintain said upper edge of the bag closed.

2. A cutting collecting bag assembly for mounting over an elliptical discharge opening formed in the housing of a rotary mower, said assembly comprising a relatively short, straight tubular chute having inlet and outlet mouths, means on said chute for mounting said chute on the mower housing, said chute being circular at sections perpendicular to its long axis, said inlet mouth lying in a plane that is inclined at an acute angle to the chute axis so that said inlet mouth is elliptical, said outlet mouth also lying in a plane that is inclined at an acute angle to the chute axis but in a direction opposite to the direction of the inclination of said inlet mouth so that said outlet mouth also is elliptical, a relatively narrow flange extending radially outwardly from and surrounding said outlet mouth, and a separable porous collecting bag having an inlet throat mounted on said chute at said outlet mouth, the throat of said bag being inextensible and of a circumference slightly greater than that of a circular chute section taken adjacent said outlet mouth, the circumference of said throat being less than that of said radially extending flange at its periphery.

3. The assembly of claim 2 wherein the inlet mouth of said chute is formed with a convex bevelled terminal portion, for forming an air seal about the elliptical discharge opening of the mower housing.

References Cited in the file of this patent

UNITED STATES PATENTS

| Re. 24,955 | Campbell | Mar. 28, 1961 |
| 1,422,105 | Kirby | July 11, 1922 |
| 2,129,105 | Spence | Sept. 6, 1938 |
| 2,734,327 | Whitney | Feb. 14, 1956 |
| 2,857,727 | Cole | Oct. 28, 1958 |
| 2,932,146 | Campbell | Apr. 12, 1960 |
| 2,970,422 | Kroll et al. | Feb. 7, 1961 |
| 2,973,614 | Horner et al. | Mar. 7, 1961 |

FOREIGN PATENTS

| 1,301 | Great Britain | 1881 |